US009873604B2

(12) United States Patent
Shin et al.

(10) Patent No.: US 9,873,604 B2
(45) Date of Patent: Jan. 23, 2018

(54) ADJUSTMENT MECHANISM FOR A BEVERAGE TAP HANDLE

(71) Applicant: TAPHANDLES, Inc., Seattle, WA (US)

(72) Inventors: Sang Hoon Shin, Seattle, WA (US); Julian Power, Seattle, WA (US); Fatch Chapeyama, Seattle, WA (US); Marcus Alan Latham, Seattle, WA (US)

(73) Assignee: Taphandles LLC, Seattle, WA (US)

( * ) Notice: Subject to any disclaimer, the term of this patent is extended or adjusted under 35 U.S.C. 154(b) by 311 days.

(21) Appl. No.: 14/640,294

(22) Filed: Mar. 6, 2015

(65) Prior Publication Data

US 2016/0257552 A1 Sep. 8, 2016

(51) Int. Cl.
*B67D 1/00* (2006.01)
*F16K 31/60* (2006.01)
*B67D 1/14* (2006.01)

(52) U.S. Cl.
CPC ......... *B67D 1/0042* (2013.01); *B67D 1/1405* (2013.01)

(58) Field of Classification Search
CPC ... B67D 1/0042; B67D 1/1405; F16B 21/065; F16B 21/075; F16K 31/60; Y10T 403/7026; Y10T 403/7033; Y10T 292/85
See application file for complete search history.

(56) References Cited

U.S. PATENT DOCUMENTS 1,707,353 A * 4/1929 Fraser ..................... F16K 31/60 251/292
2,631,393 A 3/1953 Hetherington
2,697,642 A * 12/1954 Rudy ..................... B25G 3/00 15/105
4,917,343 A * 4/1990 Wainscott ............. A47B 23/06 248/284.1
5,412,547 A 5/1995 Hornblad et al.
6,230,769 B1 * 5/2001 O'Brien .................. B67D 1/06 137/378
6,932,638 B1 8/2005 Burrows et al.
7,162,802 B2 1/2007 Benardeau et al.
(Continued)

OTHER PUBLICATIONS

Search Report for related International Patent Application No. PCT/US2016/020679 dated May 11, 2016. 4 pages.
(Continued)

*Primary Examiner* — Robert Sandy
*Assistant Examiner* — Matthew J Sullivan
(74) *Attorney, Agent, or Firm* — K&L Gates LLP

(57) ABSTRACT

Apparatuses and methods are described herein that allow a tap handle to be quickly and easily reoriented or replaced after being attached to a spigot. In an embodiment, an adjustment mechanism for a beverage tap handle includes a connecting element and a housing. The connecting element includes a stem and a first mating feature, and the housing includes an aperture to receive the stem and a second mating feature configured to mate with the first mating feature. The housing and the connecting element are (i) rotatable with respect to each other about a central axis of the stem when the first mating feature and second mating feature are not mated, and (ii) prevented from rotating with respect to each other about the central axis of the stem when the first mating feature and the second mating feature are mated.

32 Claims, 5 Drawing Sheets

(56) References Cited

U.S. PATENT DOCUMENTS

| | | | | |
|---|---|---|---|---|
| 7,703,176 | B2 * | 4/2010 | Webb | A47J 43/25 16/334 |
| 8,074,666 | B2 * | 12/2011 | Piao | A45C 11/008 132/313 |
| 8,360,404 | B2 * | 1/2013 | Motley | B67D 1/1405 251/236 |
| 2006/0147256 | A1 * | 7/2006 | Richardson | B25G 1/06 403/91 |

OTHER PUBLICATIONS

Written Opinion for related International Patent Application No. PCT/US2016/020679 dated May 11, 2016. 12 pages.
International Preliminary Report on Patentability issued in related International Patent Application No. PCT/US2016/020679 dated Sep. 12, 2017. 7 pages.

* cited by examiner

ADJUSTMENT MECHANISM FOR A BEVERAGE TAP HANDLE

FIELD OF THE INVENTION

The present disclosure generally relates to apparatuses and methods for mounting a beverage tap handle, and more specifically to an adjustment mechanism that can mount a beverage tap handle and allow the beverage tap handle to be reoriented after mounting.

BACKGROUND

In many beer dispensing systems, beer is contained in a keg and is fed by a flexible tube to a beer tap from which the beer can be dispensed. The keg is tapped with a tapping head having a beer outlet connected to the flexible tube and a gas inlet for pressurized gas. The flexible tube is attached to the beer tap, which controls the release of beer by opening a spigot using a handle. The handle acts as a lever and can be pulled sideways to open the spigot, which causes the beer to flow through the flexible tube and out of the spigot due to the pressurization of the keg by the pressurized gas.

Typically, several spigots are built into a bar, either in a commercial setting or a home setting, so that different types of beers can be dispensed from each of the spigots. When one keg is emptied, a new keg can be attached to each spigot so that the beer in the new keg can be dispensed. The types of kegs attached to each spigot are frequently alternated due to changing seasons, availability, customer preferences and various other reasons.

Many businesses identify the beer keg that is attached to each spigot by attaching a customized handle to each spigot. Because the types of beer connected to a single spigot are often alternated, many customized handles are capable of being removeably attached to each spigot so that each handle can be changed when each beer keg is changed.

The handles are often simply screwed into the spigots, which means that the final orientation of the handle is determined by how tightly the handle is turned to attach it to the spigot. This can result in a handle that does not sit in an ideal position for a customer or bartender to view a logo or other design on the handle. Additionally, some handles can be difficult to install in a desired orientation due to the shape of the handles and/or the surrounding features of the bar.

SUMMARY

The present disclosure solves the above problem by providing an adjustment mechanism that allows a tap handle to be quickly and easily reoriented or replaced after being attached to a spigot. In a general embodiment, an adjustment mechanism for a beverage tap handle includes a connecting element configured to attach to at least one of a spigot and a handle portion, the connecting element including a stem and a first mating feature, and a housing configured to attach to the other of the spigot and the handle portion, the housing including an aperture to receive the stem of the connecting element and a second mating feature configured to mate with the first mating feature of the connecting element, wherein the housing and the connecting element are (i) rotatable with respect to each other about a central axis of the stem when the first mating feature and the second mating feature are not mated, and (ii) prevented from rotating with respect to each other about the central axis of the stem when the first mating feature and the second mating feature are mated.

In another embodiment, the first mating feature and the second mating feature can be mated to place the handle portion in a plurality of different orientations with respect to the connecting element.

In another embodiment, at least one of the first mating feature and the second mating feature includes a plurality of axially symmetric ribs.

In another embodiment, at least one of the connecting element and the housing includes a magnet configured to retain the connecting element in the housing.

In another embodiment, the magnet is positioned at an end of the stem.

In another embodiment, the magnet prevents the stem from being detached from the housing.

In another embodiment, the connecting element is slideably received by the housing.

In another embodiment, the housing is formed as part of the handle portion.

In another general embodiment, an adjustment mechanism for a beverage tap handle includes a connecting element configured to attach to at least one of a spigot and a handle portion, the connecting element including a first ferromagnetic material, and a housing configured to attach to the other of the spigot and the handle portion and slideably receive the connecting element, the housing including a second ferromagnetic material configured to attract the first ferromagnetic material, wherein attraction of the first ferromagnetic material to the second ferromagnetic material retains the connecting element in the housing so that the tap handle can be used to open the spigot.

In another embodiment, the housing and the connecting element are (i) prevented from rotating with respect to each other about a central axis of the connecting element when the first ferromagnetic material and the second ferromagnetic material are located within a first distance of each other, and (ii) rotatable with respect to each other about the central axis of the connecting element when the first ferromagnetic material and second ferromagnetic material are pulled away from each other to be located a second distance from each other.

In another embodiment, the connecting element includes a first mating feature and the housing includes a second mating feature configured to mate with the first mating feature, and the connecting element and the housing are prevented from rotating with respect to each other when the first mating feature and the second mating feature are mated.

In another embodiment, at least one of the first mating feature and the second mating feature is a ribbed feature.

In another embodiment, the ribbed feature includes a plurality of axially symmetric ribs.

In another embodiment, the first ferromagnetic material acts as a stop to prevent the connecting element from being detached from the housing.

In another embodiment at least one of the first ferromagnetic material and the second ferromagnetic material is a magnet.

In another general embodiment, a beverage tap handle includes a handle portion including a first mating feature, and a connecting element configured to attach the handle portion to a spigot so that the handle portion can be pulled sideways to open the spigot, the connecting element including a second mating feature configured to mate with the first mating feature of the handle portion, wherein the connecting element is slideably received by the handle portion so that the handle portion can be (i) pulled along a central axis of the connecting element to unmate the first mating feature from the second mating feature and (ii) rotated with respect to the connecting element about the central axis of the connecting element when the first mating feature and the second mating feature are unmated.

In another embodiment, the first mating feature and the second mating feature can be mated to place the handle portion in a plurality of different orientations with respect to the connecting element.

In another embodiment, at least one of the first mating feature and second mating feature includes a plurality of axially symmetric ribs.

In another embodiment, mating of the first mating feature and the second mating feature prevents the handle portion from rotating with respect to the connecting element.

In another embodiment, the handle portion includes a first ferromagnetic material and the connecting element includes a second ferromagnetic material, and wherein attraction of the first ferromagnetic material to the second magnetic material pulls the first mating feature towards the second mating feature to mate the first mating feature with the second mating feature.

Other features and advantages will be apparent from the following specification taken in conjunction with the following drawings.

BRIEF DESCRIPTION OF THE FIGURES

Embodiments of the present disclosure will now be explained in further detail by way of example only with reference to the accompanying figures, in which.

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

FIGS. 1 to 4 illustrate an example embodiment of a tap handle 10 according to the present disclosure. Tap handle 10 includes a handle portion 12 that is configured to be gripped by a person and used as a lever, and an attachment portion 14 that is configured to attach to a spigot. In use, handle portion 12 is gripped and pulled sideways while attachment portion 14 is attach to the spigot. This sideways motion of handle portion 12 opens the spigot so that a beverage such as beer can be poured from the spigot.

Figure 1:
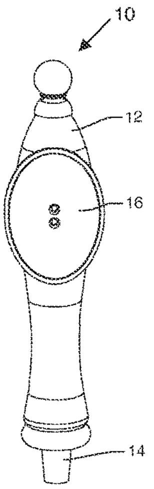
FIG. 1 shows a top perspective view of an embodiment of a tap handle according to the present disclosure.
Figure 2:
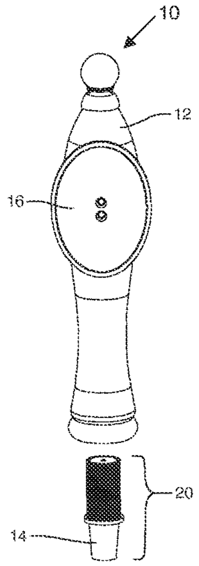
FIG. 2 shows an exploded top perspective view of the embodiment of the tap handle of FIG. 1.
Figure 3:
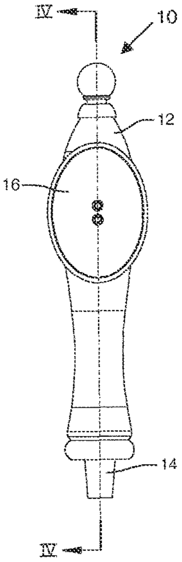
FIG. 3 shows a side elevational view of the embodiment of the tap handle of FIG. 1.
Figure 4:
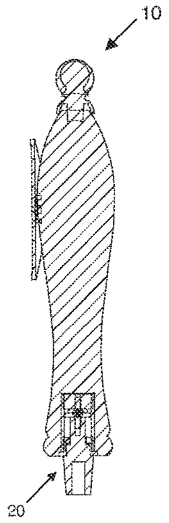
FIG. 4 shows a cross-sectional view taken across lines IV-IV of FIG. 3.

As illustrated in FIGS. 2 and 4, attachment portion 14 is part of an adjustment mechanism 20 that removeably attaches handle portion 12 to the spigot. Adjustment mechanism 20 is advantageous, for example, because it allows the orientation of handle portion 12 to be customized while tap handle 10 is attached to the spigot, as explained in more detail below. Adjustment mechanism 20 also allows handle portion 12 to be easily reoriented or replaced on the spigot if necessary.

Figure 9:
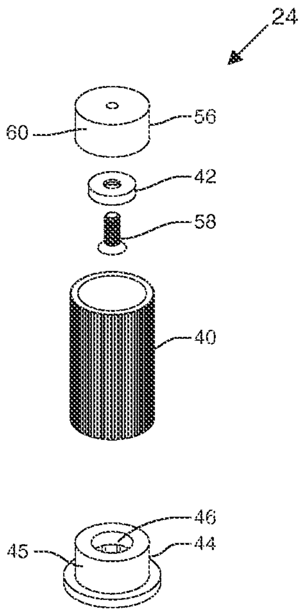
FIG. 9 shows an exploded top perspective view of an embodiment of a housing according to the present disclosure.

FIGS. 5 to 9 show exploded views of an embodiment of an adjustment mechanism 20 according to the present disclosure. As illustrated, adjustment mechanism 20 includes a connecting element 22 (FIG. 8) and a housing 24 (FIG. 9). In use, housing 24 is attached to handle portion 12 of tap handle 10, and connecting element 22 is attached to a spigot. Connecting element 22 can removeably and adjustably slide into housing 24 so that handle portion 12 can be easily replaced or reoriented as desired by a user while connecting element 22 is attached to the spigot. As will be understood by those of ordinary skill in the art, the configuration of connecting element 22 and housing 24 can be reversed, that is, so that connecting element 22 is attached to handle portion 10 and housing 24 is attached to the spigot.

Connecting element 22 includes a base 30, a first mating feature 32, a stem 34, and a magnet or other ferromagnetic material 36 (hereinafter simply referred to as "magnet 36"). Base 30 attaches connecting element 22 to a spigot. Spigots are typically threaded, so in an embodiment an inner surface 38 of base 30 includes a thread that allows base 30 to be threaded onto a spigot bolt. Alternatively, an outer surface of base 30 can be threaded to a spigot, or base 30 can be attached to a spigot using other attachment mechanisms known in the art. An advantage of the design of adjustment mechanism 20 is that the attachment of base 30 to a spigot does not affect the positioning of handle portion 12 because handle portion 12 can be easily reoriented after base 30 is attached to the spigot. Base 30, first mating feature 32, and stem 34 can be formed as a single piece or can be formed as separate pieces and then attached together.

Housing 24 includes a casing 40, a magnet or other ferromagnetic material 42 (hereinafter simply referred to as "magnet 42"), and a receiving portion 44. Casing 40 can be cast as part of handle portion 12 or can be inserted into the base of handle portion 12. In an embodiment, the outer surface of casing 40 is grooved to allow casing 40 to be friction fit into the base of handle portion 12. Alternatively, the outer surface of casing 40 can be threadedly attached to handle portion 12, casing 40 can be screwed into handle portion 12 with a screw, or casing 40 can be attached using an adhesive or another attachment mechanism known in the art.

Receiving portion 44 includes a central aperture 46 that receives stem 34 of connecting element 22. The inside surface of central aperture 46 includes a second mating feature 48 that is configured to mate with first mating feature 32 to allow adjustment mechanism 20 to adjust the orientation of handle portion 12 after adjustment mechanism 20 is installed on a spigot. In the illustrated embodiment, first mating feature 32 is a male ribbed feature with twelve axially symmetric ribs projecting outwardly from the base of stem 34 (e.g., a multi-pointed star shape), and second mating feature 48 is a female ribbed feature with twelve axially symmetric ribs projecting inwardly from central aperture 46. The twelve axially symmetric ribs of the first mating feature 32 create twelve axially symmetric gaps corresponding to the twelve axially symmetric ribs of the second mating feature 48, and allow first mating feature 32 to fit into second mating feature 48 in twelve different positions, with each position corresponding to a thirty degree rotation (360 degrees divided by twelve ribs) of housing 24 with respect to connecting element 22. Those of ordinary skill in the art will understand that first mating feature 32 and second mating feature 48 can be made with any number of ribs, for example, one rib to 360 ribs. As the number of ribs is increased, so is the number of possible orientations of handle portion 12. For example, two ribs on opposite sides of stem 34 allow for two different orientations that correspond to a 180 degree rotation of handle portion 12. Similarly, thirty-six ribs allow for thirty-six different orientations that correspond to ten degree rotational increments.

In an alternative embodiment, one of first mating feature 32 and second mating feature 48 can include a plurality of axially symmetric ribs, and the other of first mating feature 32 and second mating feature 48 can include a single rib that is configured to be positioned between adjacent ribs of the plurality of axially symmetric ribs. In such an embodiment, placement of the single rib between the plurality of axially symmetric ribs prevents the connecting element 22 and housing 24 from rotating with respect to each other when the adjustment mechanism is in a resting state, as described in more detail below.

Figure 5:
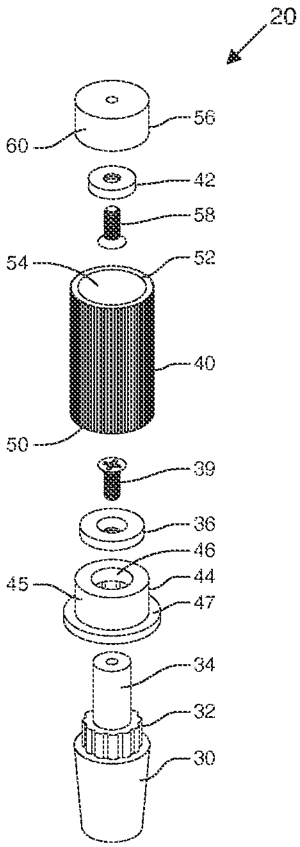
FIG. 5 shows an exploded side elevational view of an embodiment of an adjustment mechanism accordingly to the present disclosure.
Figure 6:
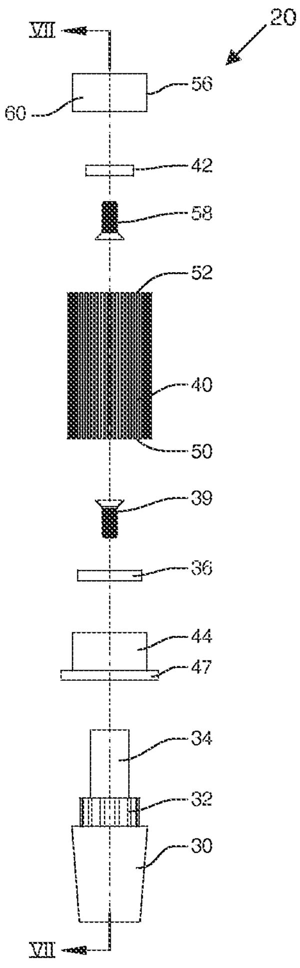
FIG. 6 shows a side elevational view of the embodiment of the adjustment mechanism of FIG. 5.
Figure 7:
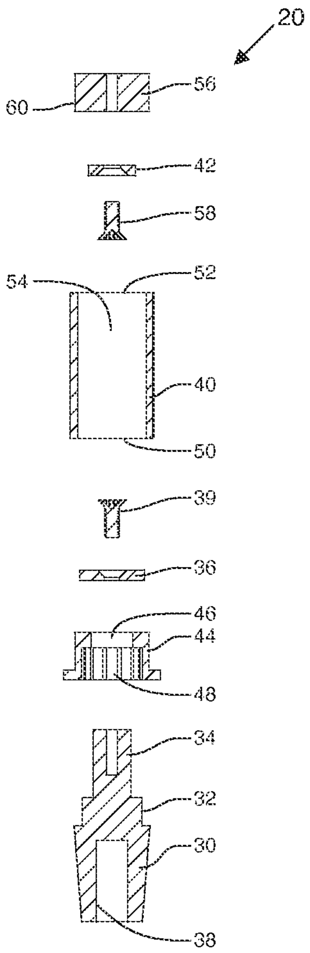
FIG. 7 shows a cross-sectional view taken across lines VII-VII of FIG. 6.
Figure 8:
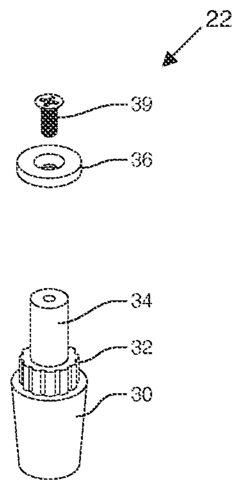
FIG. 8 shows an exploded top perspective view of an embodiment of a connecting element according to the present disclosure.

As illustrated in FIGS. 5 to 7, to construct adjustment mechanism 20, stem 34 is placed through central aperture 46 of receiving portion 44 and is then attached to magnet 36 by a fastener 39, for example a screw, an adhesive, a snap-fit mechanism or another fastener known in the art. In the illustrated embodiment, magnet 36 has a larger outer diameter than the diameter of central aperture 46, so that magnet 36 acts as a stop to prevent connecting element 22 from being detached from receiving portion 44 once magnet 36 has been attached to stem 34. In an alternative embodiment, a separate stop other than magnet 36 can be attached to stem 34 to prevent connecting element 22 from being detached from receiving portion 44. In other alternative embodiments, magnet 36 can be removed and replaced by a stop that does not include a ferromagnetic material and simply prevents connecting element 22 from being detached from receiving portion 44, or the stop feature can be eliminated so that connecting element 22 can be freely detached from female base 44.

Once magnet 36 has been attached to stem 34 so that connecting element 22 cannot be removed from receiving portion 44, receiving portion 44 can be attached to casing 40, which in the illustrated embodiment is a cylinder with a first side 50, a second side 52, and a central aperture 54 in between the first side 50 and the second side 52. In an embodiment, the outer surface 45 of receiving portion 44 includes threads that can thread receiving portion 44 to the inner surface of central aperture 54 at the first side 50 of casing 40. Those of ordinary skill in the art will recognize that receiving portion 44 can also be attached to casing 40 by other means, for example, an adhesive, a friction fit or snap-fit design, or any other attachment mechanism known in the art. Receiving portion 44 can be attached to casing 40 before or after magnet 36 is attached to stem 34. In the illustrated embodiment, receiving portion 44 includes a lip 47 that abuts casing 40 when receiving portion 44 is attached to casing 40.

Before or after receiving portion 44 is attached to the first side 50 of casing 40, magnet 42 can be attached at the second side 52 of casing 40. In the illustrated embodiment, magnet 42 is attached to block 56 by a fastener 58, for example a screw, an adhesive, a snap-fit mechanism or another fastener known in the art. In an embodiment, the outer surface 60 of block 56 includes threads that can thread block 56 to the inner surface of central aperture 54 at the second side 52 of casing 40. Those of ordinary skill in the art will recognize that block 56 can also be attached to casing 40 by other means, for example, an adhesive, a friction fit or snap-fit design, or any other attachment mechanism known in the art. In an alternative embodiment, magnet 36 can be attached at the second side 52 of casing 40 without the need for block 56. In another alternative embodiment, magnet 36 can be eliminated or located outside of casing 40.

Figure 10:
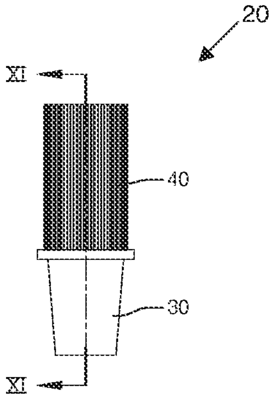
FIG. 10 shows a side elevational view of an embodiment of an adjustment mechanism according to the present disclosure.
Figure 11:
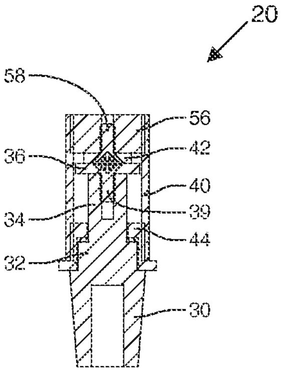
FIG. 11 shows a cross-sectional view taken across lines XI-XI of FIG. 10.
Figure 12:
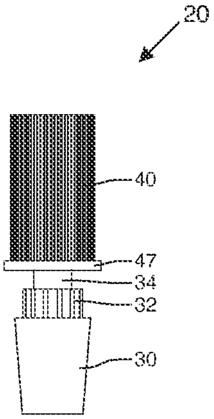
FIG. 12 shows a side elevational view of an embodiment of an adjustment mechanism according to the present disclosure.

FIGS. 10 to 12 show adjustment mechanism 20 after connecting element 22 and housing 24 have been attached to each other. FIGS. 10 and 11 show adjustment mechanism 20 in a resting state as it would typically sit when untouched. As illustrated, once connecting element 22 has been attached to housing 24, the magnetic attraction between magnet 36 and magnet 42 causes stem 34 to be pulled into casing 40 until magnet 36 contacts magnet 42, either directly or indirectly. As set forth above, one of magnet 36 and magnet 42 can simply include a ferromagnetic material that is attracted to the other of magnet 36 and magnet 42 so that there is a magnetic attraction between magnet 36 and magnet 42. In an alternative embodiment, attachment mechanism 20 can include an intermediate element located between magnet 36 and magnet 42 that still allows the magnetic attraction to occur between magnet 36 and magnet 42.

When attachment mechanism 20 is in the resting state as illustrated in FIGS. 10 and 11, connecting element 22 and housing 24 cannot be rotated with respect to each other because the mating of first mating feature 32 and second mating feature 48 prevents rotation. Thus, in the initial resting state, attachment mechanism 20 holds tap handle 12 in whatever position is initially set as base 30 is attached to a spigot.

Figure 13:
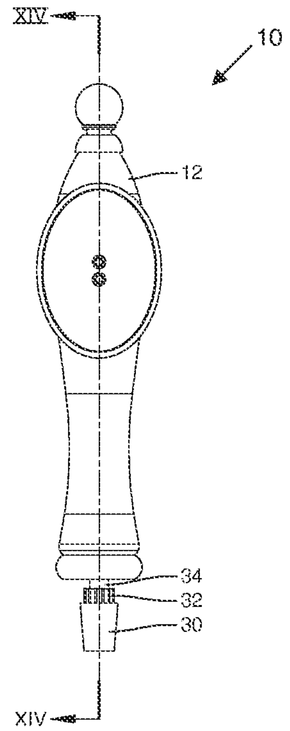
FIG. 13 shows a side devotional view of an embodiment of a tap handle according to the present disclosure.
Figure 14:
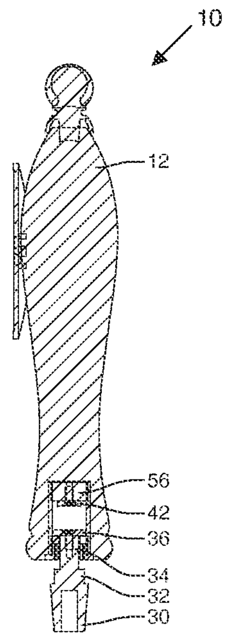
FIG. 14 shows a cross-sectional view taken across lines XIV-XIV of FIG. 13.

FIG. 12 shows attachment mechanism 20 in an adjustment state. In adjustment state, housing 24 is pulled upwards with respect to connecting element 22 along a central axis of stem 34 and/or central aperture 54, so that magnet 36 is separated from magnet 42 and so that first mating feature 32 is separated from second mating feature 48. With first mating feature 32 separated from second mating feature 48, housing 24 can be rotated with respect to connecting element 22 about the central axis of stem 34 and/or central aperture 54, so that tap handle 12 can be reoriented to a plurality of different positions. For example, in the illustrated embodiment, the twelve axially symmetric ribs of each of the first mating feature 32 and the second mating feature 48 allow housing 24 to be reoriented into twelve different resting states with respect to connecting element 22, with each resting state corresponding to a thirty degree rotation from an adjacent resting state. FIGS. 13 and 14 show tap handle 10 with attachment mechanism 20 in the adjustment state so that the indicia 16 on tap handle 10 can be rotated to any of the plurality of possible resting states. Once tap handle 12 has been rotated to a desired position, tap handle 12 can be released so that connecting element 22 again slides into housing 24 and first mating feature 32 mates with second mating feature 48 in the new resting state. The magnetic attraction between magnet 36 and magnet 42 helps to pull connecting element 22 into housing 24 until magnet 36 directly or indirectly contacts magnet 42. Once first mating feature 32 again mates with second mating feature 48, handle portion 12 becomes locked into its new resting state. The raising, rotating and reorienting of handle portion 12 can be performed as many times as desired.

Additionally, adjustment mechanism 20 can be used to replace a tap handle. In an embodiment, multiple handle portions 12 can each be provided with a housing 24 that matches up with a connecting element 22. Once connecting element 22 is installed on a spigot, the multiple handle portions 12 can interchangeably be added to and removed from connecting element 22 and easily reoriented once attached to connecting element 22. In an embodiment, connecting element 22 can be manufactured without a stop that prevents connecting element 22 from being detached from a female base 44, so as to allow the multiple handle portions 12 to be quickly installed and removed. In another embodiment, multiple handle portions 12 can be attached and detached from connecting element 22 by allowing receiving portion 44 to remain attached to stem 34 and by attaching and detaching the handle portions 12 to receiving portion 44.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. An adjustment mechanism for a beverage tap handle, comprising:

a connecting element configured to attach to one of a spigot and a beverage handle portion, the connecting element including a stem and a first mating feature; and a housing configured to attach to the other of the spigot and the beverage handle portion, the housing including an aperture to receive the stem of the connecting element and a second mating feature configured to mate with the first mating feature of the connecting element, the housing further including a casing and a receiving portion, the receiving portion located at an end of the casing closest to the connecting element and enabling the stem to slide within the casing, wherein the housing and the connecting element are (i) rotatable with respect to each other about a central axis of the stem when the first mating feature and the second mating feature are not mated, and (ii) prevented from rotating with respect to each other about the central axis of the stem when the first mating feature and the second mating feature are mated.

2. The adjustment mechanism of claim 1, wherein the first mating feature and the second mating feature can be mated to place the beverage handle portion in a plurality of different orientations with respect to the connecting element.

3. The adjustment mechanism of claim 1, wherein at least one of the first mating feature and the second mating feature includes a plurality of axially symmetric ribs.

4. The adjustment mechanism of claim 1, wherein at least one of the connecting element and the housing includes a magnet configured to retain the connecting element in the housing.

5. The adjustment mechanism of claim 4, wherein the magnet is positioned at an end of the stem.

6. The adjustment mechanism of claim 5, wherein the magnet prevents the stem from being detached from the housing.

7. The adjustment mechanism of claim 1, wherein the connecting element is slideably received by the housing.

8. The adjustment mechanism of claim 1, wherein the housing is formed as part of the beverage handle portion.

9. An adjustment mechanism for a beverage tap handle, comprising:

a connecting element configured to attach to one of a spigot and a beverage handle portion, the connecting element including a first ferromagnetic material; and a housing configured to attach to the other of the spigot and the beverage handle portion and slideably receive the connecting element, the housing including a second ferromagnetic material configured to attract the first ferromagnetic material, the housing further including a casing and a receiving portion, the receiving portion located at an end of the casing closest to the connecting element and enabling a stem of the connecting element to slide within the casing, wherein attraction of the first ferromagnetic material to the second ferromagnetic material retains the connecting element in the housing so that the beverage handle portion is operable to open the spigot.

10. The adjustment mechanism of claim 9, wherein the housing and the connecting element are (i) prevented from rotating with respect to each other about a central axis of the connecting element when the first ferromagnetic material and the second ferromagnetic material are located within a first distance of each other, and (ii) rotatable with respect to each other about the central axis of the connecting element when the first ferromagnetic material and second ferromagnetic material are pulled away from each other to be located a second distance from each other.

11. The adjustment mechanism of claim 9, wherein the connecting element includes a first mating feature and the housing includes a second mating feature configured to mate with the first mating feature, and wherein the connecting element and the housing are prevented from rotating with respect to each other when the first mating feature and the second mating feature are mated.

12. The adjustment mechanism of claim 11, wherein at least one of the first mating feature and the second mating feature is a ribbed feature.

13. The adjustment mechanism of claim 12, wherein the ribbed feature includes a plurality of axially symmetric ribs.

14. The adjustment mechanism of claim 9, wherein the first ferromagnetic material acts as a stop to prevent the connecting element from being detached from the housing.

15. The adjustment mechanism of claim 9, wherein at least one of the first ferromagnetic material and the second ferromagnetic material is a magnet.

16. A beverage tap handle, comprising:

a beverage handle portion including a first mating feature; and a connecting element configured to attach the beverage handle portion to a spigot so that the beverage handle portion is operable to be pulled sideways to open the spigot, the connecting element including a second mating feature configured to mate with the first mating feature of the beverage handle portion, wherein the first mating feature and the second mating feature are operable to be mated to enable the beverage handle portion to be operated in a plurality of different orientations, wherein the connecting element is slideably received by the beverage handle portion so that the beverage handle portion is operable to be (i) pulled along a central axis of the connecting element to unmate the first mating feature from the second mating feature without disconnecting the beverage handle portion from the connecting element and (ii) rotated with respect to the connecting element about the central axis of the connecting element without disconnecting the beverage handle portion from the connecting element when the first mating feature and the second mating feature are unmated.

17. The beverage tap handle of claim 16, wherein the first mating feature and the second mating feature can be mated to place the beverage handle portion in a plurality of different orientations with respect to the connecting element.

18. The beverage tap handle of claim 16, wherein at least one of the first mating feature and the second mating feature includes a plurality of axially symmetric ribs.

19. The beverage tap handle of claim 16, wherein mating of the first mating feature and the second mating feature prevents the beverage handle portion from rotating with respect to the connecting element.

20. The beverage tap handle of claim 16, wherein the beverage handle portion includes a first ferromagnetic material and the connecting element includes a second ferromagnetic material, and wherein attraction of the first ferromagnetic material to the second ferromagnetic material pulls the first mating feature towards the second mating feature to mate the first mating feature with the second mating feature.

21. The adjustment mechanism of claim 1, which includes the beverage handle portion, and wherein one of the connecting element and the housing attaches to the beverage handle portion.

22. The adjustment mechanism of claim 1, wherein the receiving portion prevents the connecting element from detaching from the casing.

23. The adjustment mechanism of claim 1, wherein the casing is formed separately from the receiving portion.

24. The adjustment mechanism of claim 9, which includes the beverage handle portion, and wherein one of the connecting element and the housing attaches to the beverage handle portion.

25. The adjustment mechanism of claim 9, wherein the receiving portion prevents the connecting element from detaching from the casing.

26. The adjustment mechanism of claim 9, wherein the casing is formed separately from the receiving portion.

27. The beverage tap handle of claim 16, wherein the first mating feature is located on a housing attached to the beverage handle portion, the housing including a casing and a receiving portion, wherein the receiving portion prevents the connecting element from detaching from the casing.

28. The beverage tap handle of claim 16, wherein the first mating feature is located on a housing attached to the beverage handle portion, the housing including a casing and a receiving portion, wherein the receiving portion is located at an end of the casing closest to the connecting element and enables a stem of the connecting element to slide within the casing.

29. An adjustment mechanism for a beverage tap handle, comprising:

a connecting element configured to attach to one of a spigot and a beverage handle portion, the connecting element including a stem and a first mating feature; and a housing configured to attach to the other of the spigot and the beverage handle portion, the housing including an aperture to receive the stem of the connecting element and a second mating feature configured to mate with the first mating feature of the connecting element, the housing further including a casing and a receiving portion, the receiving portion preventing the connecting element from detaching from the casing, wherein the housing and the connecting element are (i) rotatable with respect to each other about a central axis of the stem when the first mating feature and the second mating feature are not mated, and (ii) prevented from rotating with respect to each other about the central axis of the stem when the first mating feature and the second mating feature are mated.

30. An adjustment mechanism for a beverage tap handle, comprising:

a connecting element configured to attach to one of a spigot and a beverage handle portion, the connecting element including a first ferromagnetic material; and a housing configured to attach to the other of the spigot and the beverage handle portion and slideably receive the connecting element, the housing including a second ferromagnetic material configured to attract the first ferromagnetic material, the housing further including a casing and a receiving portion, the receiving portion preventing the connecting element from detaching from the casing, wherein attraction of the first ferromagnetic material to the second ferromagnetic material retains the connecting element in the housing so that the beverage handle portion is operable to open the spigot.

31. A beverage tap handle, comprising:

a beverage handle portion including a first mating feature; and a connecting element configured to attach the beverage handle portion to a spigot so that the beverage handle portion is operable to be pulled sideways to open the spigot, the connecting element including a second mating feature configured to mate with the first mating feature of the beverage handle portion, wherein the connecting element is slideably received by the beverage handle portion so that the beverage handle portion is operable to be (i) pulled along a central axis of the connecting element to unmate the first mating feature from the second mating feature and (ii) rotated with respect to the connecting element about the central axis of the connecting element when the first mating feature and the second mating feature are unmated, and wherein the first mating feature is located on a housing attached to the beverage handle portion, the housing including a casing and a receiving portion, wherein the receiving portion prevents the connecting element from detaching from the casing.

32. A beverage tap handle, comprising:

a beverage handle portion including a first mating feature; and a connecting element configured to attach the beverage handle portion to a spigot so that the beverage handle portion is operable to be pulled sideways to open the spigot, the connecting element including a second mating feature configured to mate with the first mating feature of the beverage handle portion, wherein the connecting element is slideably received by the beverage handle portion so that the beverage handle portion is operable to be (i) pulled along a central axis of the connecting element to unmate the first mating feature from the second mating feature and (ii) rotated with respect to the connecting element about the central axis of the connecting element when the first mating feature and the second mating feature are unmated, and wherein the first mating feature is located on a housing attached to the beverage handle portion, the housing including a casing and a receiving portion, wherein the receiving portion is located at an end of the casing closest to the connecting element and enables a stem of the connecting element to slide within the casing.

* * * * *